United States Patent [19]
Hamedani

[11] Patent Number: 5,996,336
[45] Date of Patent: Dec. 7, 1999

[54] JET ENGINE HAVING RADIAL TURBINE BLADES AND FLOW-DIRECTING TURBINE MANIFOLDS

[76] Inventor: Mohammad F. Hamedani, 3615 Longlake Dr., Duluth, Ga. 30136

[21] Appl. No.: 08/959,181

[22] Filed: Oct. 28, 1997

[51] Int. Cl.⁶ .................................. F02R 3/02; F02C 7/08
[52] U.S. Cl. ........................ 60/226.1; 60/39.37; 60/39.52; 60/39.75
[58] Field of Search ................ 60/226.1, 226.3, 60/39.75, 39.512, 39.52, 39.37

[56] References Cited

U.S. PATENT DOCUMENTS

| | | | |
|---|---|---|---|
| 2,608,058 | 8/1952 | Geeraert | 60/39.75 |
| 2,648,491 | 8/1953 | Wood . | |
| 2,990,685 | 7/1961 | Hoover, Jr. | 60/39.52 |
| 3,070,131 | 12/1962 | Wheatley | 60/262 |
| 3,359,908 | 12/1967 | Toma | 103/3 |
| 3,782,108 | 1/1974 | Holste | 30/39.02 |
| 3,923,416 | 12/1975 | Frey | 415/76 |
| 3,934,418 | 1/1976 | DeBaun | 60/624 |
| 4,073,069 | 2/1978 | Basmajian | 35/13 |
| 4,641,498 | 2/1987 | Markovitch et al. | 60/601.2 |

OTHER PUBLICATIONS

Michael Valenti,"Upgrading Jet Turbine Technology," Mechanical Engineering (Dec., 1995).
Michael Valenti,"New Gas–Turbine Designs Push The Envelope," Mechanical Engineering (Aug., 1997).
Franklin van den Hout and Jo Koullen,"A Tiny Turbojet For Model Aircraft," Mechanical Engineering (Aug., 1997).
Bill Gunston, "Jet and Turbine Aero Engines," (1995).

*Primary Examiner*—Charles G. Freay
*Attorney, Agent, or Firm*—Gardner & Groff, P.C.

[57] ABSTRACT

A jet aircraft engine having an improved turbine section with curved intake manifolds to direct combustion gasses from the engine's combustion chamber into the turbine housing on a chordal flow path through the turbine generally perpendicular to the turbine rotor's axis of rotation. The turbine rotor has a number of radially extending turbine blades for transmitting energy from the combustion gasses to shaft work to drive the engine's fan and compressor. Exhaust manifolds can also be provided, directing the flow of exhaust gasses from the turbine to the engine's intake, and having noise and emissions control capability.

21 Claims, 4 Drawing Sheets

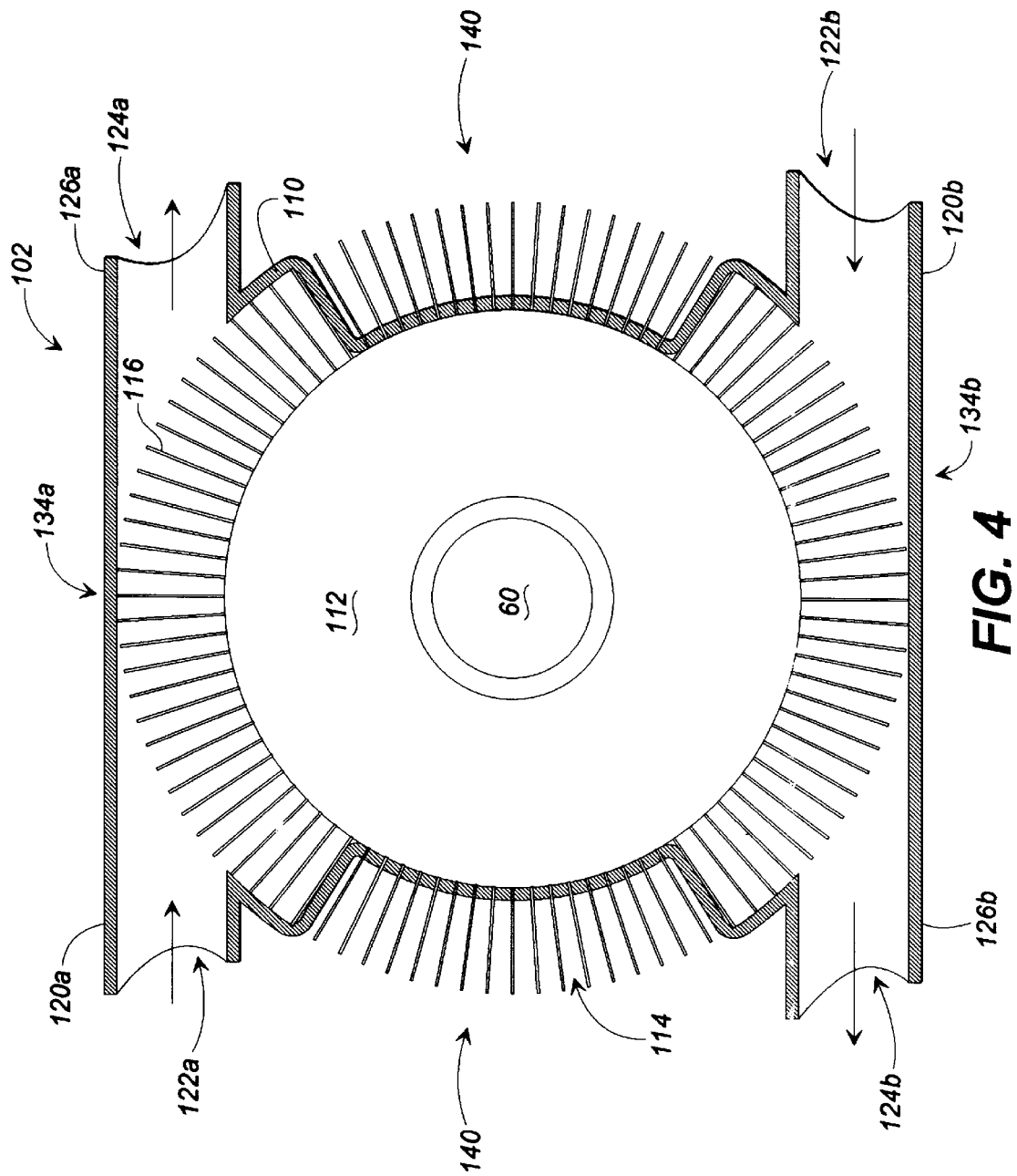

JET ENGINE HAVING RADIAL TURBINE BLADES AND FLOW-DIRECTING TURBINE MANIFOLDS

BACKGROUND OF THE INVENTION

1. Field of the Invention

The present invention relates generally to a jet aircraft engine having an improved turbine section. The invention relates more specifically to a gas turbine jet aircraft engine and a turbine section for a jet aircraft engine wherein the blades of the turbine rotor extend radially outwardly from the rotor's axis of rotation, and wherein curved manifolds are provided for directing combustion gases from the engine's combustion chamber through the turbine housing along a chordal flowpath generally perpendicular to the axis of rotation of the turbine rotor.

2. Description of Related Art

Gas-turbine jet aircraft engines were first developed in the 1920's and 1930's by Whittle. In its most basic form, the gas-turbine engine comprises an air intake, a compressor to compress the airflow from the intake, a combustion chamber where fuel is introduced to the compressed airflow and the fuel/air mixture is combusted to create a flow of hot, high-pressure combustion gasses, and a turbine to convert energy from the combustion gasses to shaft power to drive the compressor. The spent gasses exiting the turbine are expelled to the atmosphere through a nozzle or jetpipe to generate propulsive thrust. Typically, these components are arranged in axial alignment so that the working fluid passes generally linearly through the engine, from the intake to the exhaust.

A further development to gas-turbine jet aircraft engines is the turbofan engine, shown in typical form in FIG. 1. The majority of the thrust provided by a turbofan engine 10 is generated by the fan 12, which is rotationally driven by a shaft 14 within a fan cowl 16. A core cowling 18 mounted behind the fan 12 and coaxially with the fan cowl 16 forms the intake 20 for the airflow through the engine's power-generating core. This airflow first enters a compressor 22, which is typically a multistage axial compressor. Each stage of the compressor 22 typically comprises a rotating ring of rotor blades 24 within a stator ring 26. The compressor typically is driven by the drive shaft 14 coupled to the engine's turbine. Compressed air exiting the compressor 22 enters a combustion chamber 30, where fuel is introduced to form a compressed air/fuel mixture. This mixture is combusted to generate hot, high-pressure combustion gasses which are exhausted from the combustion chamber 30 to the engine's turbine section 34.

The turbine section of known gas-turbine aircraft engines commonly comprises one or more fan-like axial flow turbine rotors 36, each comprising a plurality of angularly or helically mounted turbine blades 38. Each turbine stage extracts energy from the exhaust airflow as the airflow passes axially through the blades of the turbine rotors 36. The turbine rotors, in turn, drive the shaft which powers the fan 12 and the compressor 22. Air discharged from the turbine section 34 exits the engine exhaust 40. An informative summary of existing aircraft turbine technology, and of gas-turbine aircraft engines in general, is provided by Bill Gunston, *The Development of Jet and Turbine Aero Engines*, pp. 39–48 (1995).

Radial flow turbines are also known, wherein high-pressure combustion gasses exiting the combustion chamber are introduced to the outer periphery of the turbine rotor and directed radially inwardly, to be discharged from a central region of the turbine. These radial flow turbines typically comprise a turbine rotor having a number of turbine blades extending in a generally spiral pattern, from adjacent the rotor's central region to the rotor's outer diameter.

Existing axial and radial flow turbines have been found, by their nature, to suffer a number of drawbacks. For example, in order to permit the high pressure combustion gasses to pass axially or radially through the turbine, a significant portion of the rotor's surface area must be open to airflow between adjacent turbine blades. Although modern multistage jet aircraft engine turbines provide greatly improved efficiencies in transferring energy from the combustion gasses to the engine's driveshaft as compared to earlier turbines, a considerable amount of energy is lost through the turbine exhaust due to the open nature of the airflow through the turbine. This lost energy results in lower horsepower-to-fuel consumption and horsepower-to-weight ratios than could be achieved were the turbine capable of more efficient energy recovery.

The open flow of combustion gasses through known axial and radial flow turbines also has been found to generate undesirable levels of noise. Moreover, because the spent combustion gasses typically exhaust through an open jetpipe downstream of the turbine, existing turbine construction has hindered efforts to provide noise and emissions control to the exhaust sections of existing jet engines. For example, the large cross-sectional area of typical jetpipes effectively prevents the utilization of known available catalytic converter or muffler equipment in the treatment of the engine's exhaust. In addition, the back-pressure which such devices typically generate would adversely affect the efficiency of known varieties of turbines.

In recent years, considerable development effort has been directed to improving the performance and efficiency of gas turbine aircraft engines. Michael Valenti, *Upgrading Jet in Turbine Technology*, MECHANICAL ENGINEERING, December 1995. These development efforts, however, have been primarily directed to refining existing axial or radial flow gas turbine engine geometries and improved materials of construction for conventional gas turbine engines.

Thus it can be seen that a need exists for a gas turbine jet aircraft engine comprising an improved turbine section allowing more efficient conversion of energy from the high pressure combustion gasses exiting the combustion chamber to drive the engine's driveshaft. A need also exists for a jet aircraft engine having an improved turbine enabling increased horsepower-to-fuel consumption performance. A need further exists for a jet aircraft engine turbine which generates less noise than previously existing turbines, and which permits the incorporation of noise and emissions control equipment into the engine.

It is to the provision of a jet aircraft engine and a turbine for a jet aircraft engine meeting these and other needs that the present invention is primarily directed.

BRIEF SUMMARY OF THE INVENTION

Briefly described, in preferred form, the present invention comprises a gas turbine jet aircraft engine generally comprising a compressor, a combustion chamber and an improved turbine section. The improved turbine of the present invention preferably comprises one or more turbine stages, each stage comprising a turbine housing, a turbine rotor rotationally mounted within the turbine housing, and one or more intake manifolds for directing high-pressure combustion gasses from the combustion chamber into the turbine housing.

The turbine rotor of the present invention is preferably coupled to the engine's driveshaft to transmit energy recovered from the high-pressure combustion gasses to drive the engine's compressor and, for engines of the turbofan variety, to also drive the engine's fan. The turbine rotor preferably comprises a plurality of turbine blades extending generally radially outward from the rotational axis of the rotor. These turbine blades preferably are configured so that their outer and side edges fit in close proximity to the inner contours of the turbine housing. The root or inner edges of the blades are joined at a central hub forming the point of coupling with the driveshaft.

The intake manifolds of the turbine preferably comprise generally curved conduits for collecting high-pressure combustion gasses from the engine's combustion chamber and directing the gasses along a curved path from the combustion chamber into an intake port in the turbine housing. The manifolds preferably introduce the flow of combustion gasses into the housing intake at an angle generally perpendicular to the axis of rotation of the turbine rotor and across the rotor along a chordal (i.e., non-radial) path removed a distance from the rotor's center. The gasses impinge generally perpendicularly on the face of the rotor blades, to transform energy from the high-pressure gasses to rotationally drive the rotor. An exhaust port provided in the turbine housing opposite the intake port allows the spent gasses to discharge from the housing.

The flowpath of combustion gasses through the turbine housing, from the intake port to the exhaust port defines a "power section" of the turbine. Each turbine housing can be provided with one or more corresponding pairs of intake and exhaust ports to create one or more power sections for driving each turbine rotor. In a preferred embodiment, described in greater detail below, each turbine housing is provided with two power sections, one diametrically opposite the other. The turbine housing of the present invention preferably comprises one or more cutout sections between adjacent power sections of the turbine, to permit cooling of the turbine blades by ambient air.

If multiple turbine stages are utilized, separate intake manifolds can be incorporated for each stage, successive manifolds preferably being angularly offset from one another along the engine's circumference. Each intake manifold preferably receives combustion gasses from a separate combustion chamber section.

Exhaust manifolds can be also be provided to direct the spent combustion gasses from the exhaust ports of the turbine housing to the ambient air. In preferred form, the exhaust manifolds loop forward to discharge the exhaust gasses into the fan's intake. In this manner, the suction generated at the fan's intake serves to reduce or eliminate any back-pressure in the exhaust manifold. By routing the exhaust manifolds through a portion of the airstream forming the working fluid of a turbofan engine's thrust-generating fan, heat exchange is facilitated between the exhaust and the airstream, thereby causing the airstream to thermally expand while simultaneously cooling the exhaust. The exhaust manifolds can be provided with noise and/or emissions control devices such as mufflers or catalytic converters to reduce noise and other pollution generated by the engine.

It is therefore an object of the present invention to provide a jet aircraft engine having an improved horsepower-to-fuel consumption ratio resulting from the incorporation of a closed, positive displacement turbine section wherein curved manifolds direct combustion gasses from the engine's combustion chamber into a manifold housing along a chordal flow path generally perpendicular to the axis of rotation of the turbine's rotor, and wherein the turbine's rotor comprises a plurality of axially extending turbine blades.

It is another object of the present invention to provide a jet aircraft engine enabling noise and emissions control through the use of a turbine section comprising a turbine housing with exhaust manifolds for collecting spent combustion gasses from the turbine and exhausting those gasses through noise and/or emissions control devices.

These and other objects, features and advantages of the present invention will become more apparent upon reading the following specification in conjunction with the accompanying drawing figures.

DESCRIPTION OF THE FIGURES

FIG. 4 is a cross-sectional view showing the turbine and gas-flow patterns of the present invention in greater detail.

DETAILED DESCRIPTION OF A PREFERRED EMBODIMENT

Figure 1:
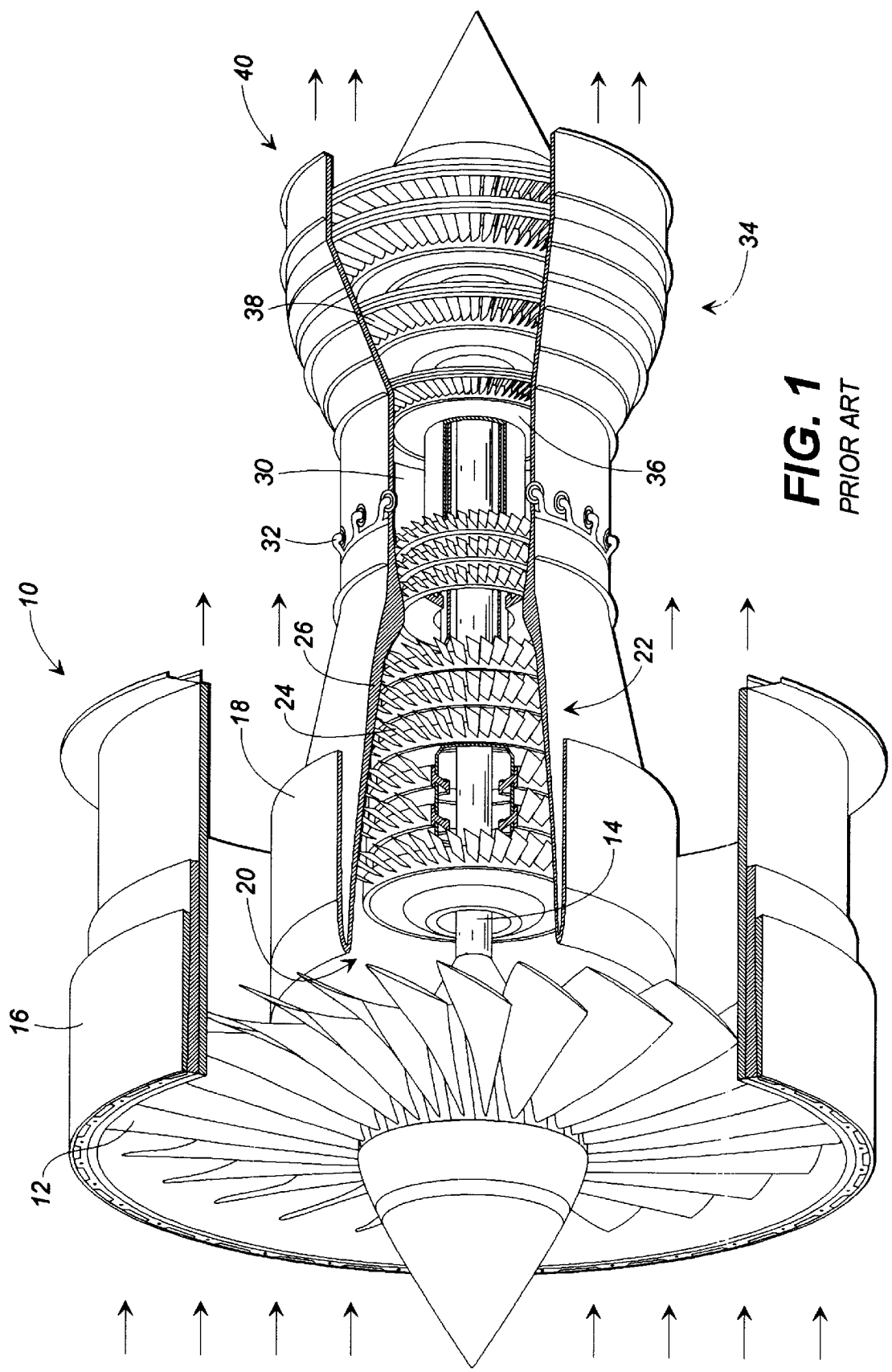
FIG. 1 shows a perspective view of a prior art turbofan aircraft engine, in partial cross-section, and having a turbine section according to known form.
Figure 2:
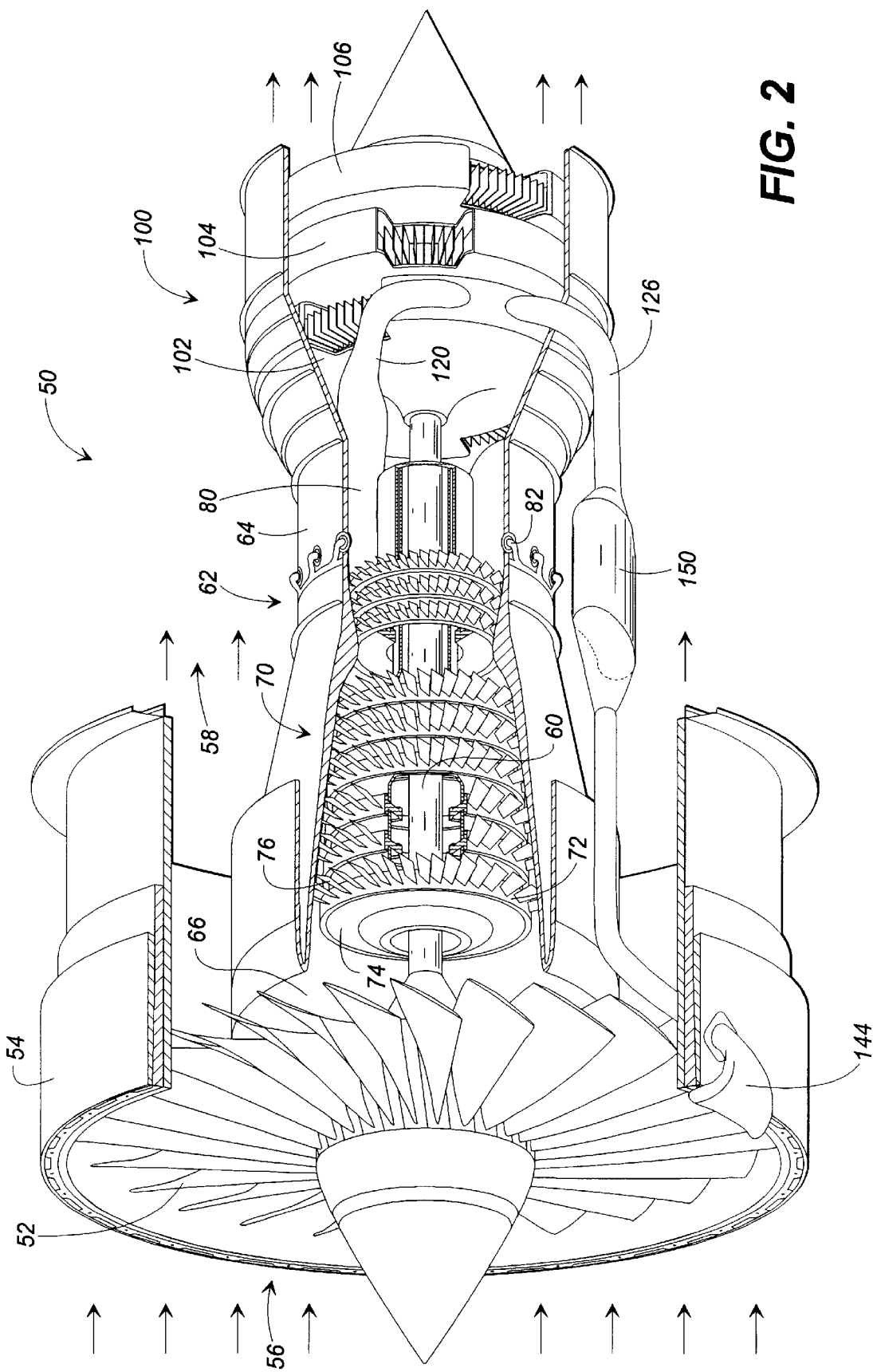
FIG. 2 shows, in partial cross-section, a perspective view of an aircraft engine incorporating a turbine section according to the present invention.

Referring now in detail to the drawing figures wherein like reference numerals represent like parts throughout, FIG. 2 shows a gas-turbine jet aircraft engine according to a preferred form of the present invention. Although the embodiment depicted by FIG. 2 shows a gas turbine engine of the turbofan variety, it will be readily understood to those of ordinary skill in the art that the teachings of the present invention are applicable to other types of gas turbine aircraft engines utilizing turbines to convert energy from combustion gasses to drive the engine's compressor and other components.

As shown in FIG. 2, the gas turbine engine 50 comprises a rotationally driven fan 52 for generating thrust. A fan cowl 54 surrounds the fan 52 to form an intake 56 and an exhaust 58 for the air which is the working fluid upon which the fan 52 operates to generate thrust.

The fan 52 is rotationally driven by a drive shaft 60 which extends axially through the length of the engine. A power generating core 62, surrounded by a core cowling 64, is mounted behind the fan 52 and coaxially with the drive shaft 60. A portion of the air passing through the fan 52 enters the core inlet 66 for introduction to the engine's compressor 70.

The compressor 70 is preferably a multi-stage axial compressor comprising multiple compressor stages 72, each stage comprising a compressor rotor 74 and a plurality of compressor blades 76 mounted thereon. The compressor rotors 74 are coupled to the drive shaft 60, which drives the compressor. p Air entering the core cowling 64 is compressed as it passes through the compressor 70, and is discharged into the engine's combustion chamber 80. Fuel is introduced into the combustion chamber 80 through one or more fuel inlets 82, and is mixed with the compressed air to form a compressed air/fuel mixture. Combustion means (unshown) ignite this mixture to generate hot, high-pressure combustion gasses which are discharged from the combustion chamber to the engine's turbine section 100. Separate combustion chamber segments can be provided for discharge to each intake manifold described below.

The turbine section 100 of the present invention preferably comprises one or more turbine stages. As seen best in FIG. 3, each turbine stage preferably comprises a turbine housing 110, a turbine rotor 114, and a flow-directing turbine manifold system as described in greater detail below. In the embodiment depicted by FIG. 2, three turbine stages 102, 104, 106 are shown. For the sake of brevity, only one turbine stage 102 will be described in detail, it being understood that the remaining turbine stages are of similar construction. Also, for purposes of clarity, the manifold systems (described below) for turbine stages 104, 106 are not fully shown in FIG. 2, but will be understood to be of substantially like construction as the depicted manifold system of turbine stage 102.

Figure 3:
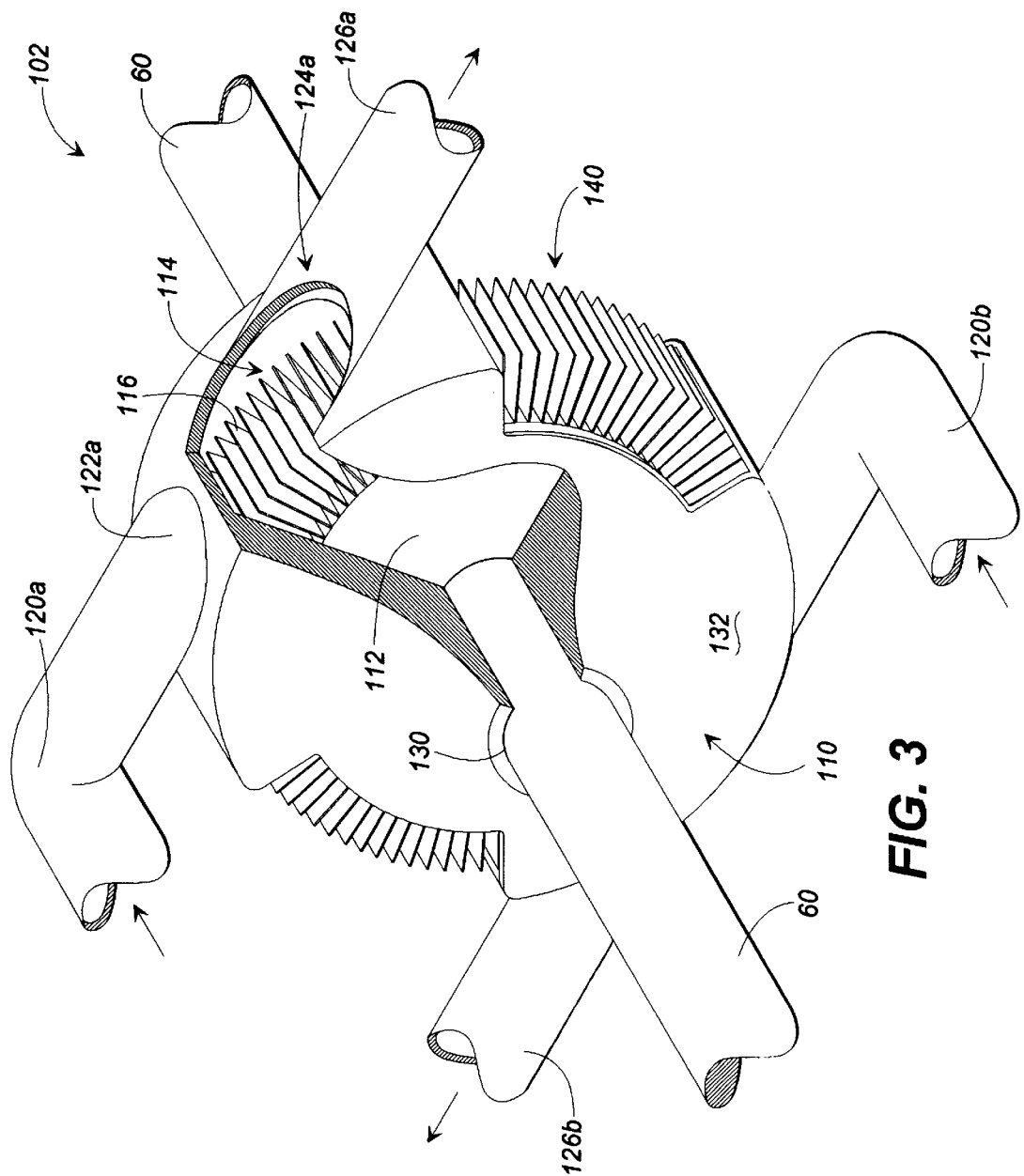
FIG. 3 is a perspective view, in partial cutaway, showing the turbine of the present invention in greater detail.

The turbine housing 110, as seen best in FIG. 3, preferably comprises a generally cylindrical, hollow element through which the engine's driveshaft 60 passes. A shaft opening 130 is provided in the end face 132 of the turbine housing 110 to allow the engine's driveshaft 60, which is coupled to the turbine's hub 112, to pass through the turbine housing 110. Bearings and/or seals (unshown) can be provided in the shaft opening 130.

The rotor 114 preferably comprises a plurality of turbine blades 116 extending generally radially outwardly from the hub 112. The turbine blades 116 preferably are rigidly connected at their inner or root edge to the hub 112 of the turbine rotor 114. The outer and side edges of the turbine blades 116 preferably are configured to closely match the inner contours of the turbine housing 110, with sufficient clearance to allow free rotation of the rotor 114, but prevent any significant leakage of the combustion gasses between the turbine blades 116 and the housing 110. Sealing means (unshown) can be provided at the interface between the outer and side edges of the turbine blades 116 and the interior of the turbine housing 110.

As seen best in FIGS. 3 and 4, in preferred form, each turbine stage of the present invention further comprises a turbine manifold system which can incorporate one or more intake manifolds 120a, 120b for collecting at least a portion of the high-pressure combustion gasses from the engine's combustion chamber and directing those gasses from the combustion chamber into one or more intake ports 122a, 122b in the turbine housing 110. One or more exhaust ports 124a, 124b are preferably provided in the turbine housing 110, forming corresponding pairs with each intake port 122a, 122b. Each exhaust port 124a, 124b preferably communicates with an exhaust manifold 126a, 126b, to discharge spent combustion gasses from the turbine housing 110.

The intake manifolds 120a, 120b preferably introduce the flow of combustion gasses into the intake ports 122a, 122b of the turbine housing 110, along a flow path through the housing 110 generally perpendicular to the axis of rotation of the turbine rotor 114. The combustion gasses impinge upon the turbine blades 116, as the combustion gasses pass through the turbine housing 110 from the intake ports 122a, 122b to the exhaust ports 124a, 124b along a chordal path a distance from the turbine's axis of rotation.

The flow path of the combustion gasses within the turbine housing is shown best by the directional arrows in FIG. 4. As depicted, the combustion gasses flow through the turbine housing 110 generally perpendicularly to the axis of rotation of the turbine rotor 114 and generally tangential to the direction of rotation of the rotor 114, between the intake ports 122a, 122b and the exhaust ports 124a, 124b. The flow path of combustion gasses through the turbine is chordal with respect to the generally circular cross-section of the turbine rotor. In other words, the combustion gasses pass through the turbine non-radially, from an intake port 122 at a point adjacent the rotor's outer diameter to an exhaust port 124 also at a point adjacent the rotor's outer diameter. The combustion gasses pass through one or more power sections 134a, 134b of the turbine, defined as that section of the turbine between corresponding intake and exhaust ports, where the combustion gasses impinge upon the turbine blades 116 to rotationally drive the turbine's rotor 114 and thereby drive the drive shaft 60. By providing turbine blades 116 which extend radially from the turbine's hub 112, and directing the combustion gasses along a flow path generally perpendicular to the axis of rotation of the turbine rotor 114, against the turbine blades 116 along a chordal path separated a distance from the axis of rotation, a closed, positive-displacement energy transfer system is provided. In this manner, more efficient energy transfer from the combustion gasses to the drive shaft 60 can be achieved. Also, exhaust noise is significantly reduced.

In preferred form, one or more cutout sections 140 are provided in the turbine housing 110, as shown best in FIGS. 3 and 4. The cutout sections 140 permit the turbine blades 116 to be exposed to an airflow for cooling between successive power sections of the turbine. This airflow can be from a portion of the compressed air from the compressor 70 which bypasses the combustion chamber 80. For example, in a preferred embodiment, approximately 25% of the air from the compressor may bypass the combustion chamber for cooling purposes. In the depicted embodiment, each turbine housing is provided with two power sections 134a, 134b, one diametrically opposite the other. Two cutout sections 140 are provided, along either side of the turbine housing 110, between the power sections 134a, 134b.

In preferred form, the one or more exhaust manifolds 126a, 126b collect spent exhaust gasses from the exhaust ports 124a, 124b of the turbine housing 110, and direct the spent combustion gasses to a discharge point adjacent the engine's intake 56. In this manner, the fan 52 generates suction to draw the spent combustion gasses through the exhaust manifolds 126a, 126b, thereby reducing or eliminating any back-pressure which might adversely effect the turbine's efficiency. The discharge end 144 of the exhaust manifold 126 is preferably flared to further minimize back pressure. The exhaust manifolds 126 also function to reduce noise emissions from the engine. One or more exhaust treatment devices 150 can be provided in the exhaust manifolds 126a, 126b. The exhaust treatment devices 150 can comprise, for example, a muffler for additional noise reduction, a catalytic converter for emissions control, or other pollution control devices. One or more struts or supports (unshown) may be necessary to support the exhaust manifolds 126.

In preferred form, the exhaust manifolds 126 direct at least a portion of the spent combustion gasses from the turbine exhaust through the air forming the working fluid of the thrust-generating fan 52. As depicted in FIG. 2, for example, a portion of the exhaust manifold 126 passes through the annular space between the core cowling 64 and the fan cowl 54. The exhaust manifold 126 then passes through the fan cowl 54, to the engine's exterior, and discharges the exhaust gasses adjacent the intake 56 of the fan 52. In this manner, heat transfer from the hot exhaust manifold 126 to the airstream from the thrust-generating fan 52 is facilitated. This heat transfer may benefit the engine's performance in two manners. First, thermal expansion of the airstream 58 from the fan 52, due to heat transfer from the exhaust manifold 126, may increase the thrust generated by the engine. Second, this heat transfer assists in cooling the exhaust manifold, thereby reducing heat-induced stress failures.

The one or more intake manifolds 120a, 120b and the one or more exhaust manifolds 126a, 126b comprise a turbine manifold system which receives high-pressure combustion gasses from the engine's combustion chamber 80, directs the gasses along a generally curved path from the combustion chamber into the intake ports 122a, 122b in the turbine housing, and discharges the spent combustion gasses from the turbine housing 110. The exhaust manifolds 126 are preferably somewhat larger in cross-sectional area than the intake manifolds 120, so that flow through the turbine is not impeded by back pressure. It will be understood that the size of the manifolds will be determined by the volume of combustion gasses generated by a particular engine.

As seen best in FIG. 2, the turbine section 100 of the present invention can comprise one or more turbine stages. Three stages 102, 104, 106 are depicted in FIG. 2. In order to accommodate the turbine manifold system of each turbine stage, each stage is preferably angularly offset from the adjacent stages. For example, in the depicted embodiment having three stages with two power sections per stage, six intake manifolds will be present. Thus, the intake manifolds can be offset at equal intervals of 60° from one another about the engine's circumference. In general, for equal spacing with an engine configuration having n intake manifolds, the spacing of adjacent manifolds will be 360°/n. The exhaust manifolds can be equally spaced about the engine's circumference in like manner.

In operation, in preferred form, the gas turbine jet aircraft engine of the present invention operates by drawing air through its intake 56. The fan 52 operates on the air to generate the majority of the engine's thrust. A portion of the intake air is drawn into the engine's core inlet 66, where it is compressed through the successive stages of the compressor 70. The compressed air is mixed with fuel in the engine's combustion chamber 80, and combusted to generate hot, high-pressure combustion gasses. These combustion gasses are collected by the intake manifolds 120, and directed into the turbine housing 110 along a flow path generally perpendicular to the axis of rotation of the turbine rotor 114. Energy from the combustion gasses is converted by the turbine blades 116 into shaft work to drive the engine's driveshaft 60 which, in turn, powers the engine's compressor 70 and the fan 52. The spent combustion gasses are discharged from the turbine housing 110 through the exhaust ports 124 and into the exhaust manifolds 126. The spent combustion gasses can then be treated by the exhaust treatment device 150 and discharged from the discharge end 144 of the exhaust manifold 126.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A jet engine comprising:
   (a) a compressor for receiving and compressing air;
   (b) a combustion chamber for receiving compressed air from said compressor, said combustion chamber comprising means for introducing fuel into said compressed air to form a mixture, and means for combusting said mixture to generate a flow of combustion gasses;
   (c) a turbine for recovering energy from the flow of combustion gasses, said turbine comprising at least one rotor rotatable about an axis of rotation;
   (d) means for directing at least a portion of the flow of combustion gasses from said combustion chamber through said turbine along a non-radial flowpath generally perpendicular to the axis of rotation of said rotor; and
   (e) a fan for generating thrust within a working fluid, said fan being coupled to a driveshaft driven by said turbine.

2. The jet engine of claim 1, wherein said means for directing at least a portion of the flow of combustion gasses comprises at least one intake manifold between said combustion chamber and an intake port of said turbine.

3. The jet engine of claim 2, comprising a plurality of turbines, each comprising a rotor rotatable about a common axis of rotation and having at least one intake manifold associated therewith, and wherein said intake manifolds of each said rotor are angularly offset from one another about the circumference of the engine.

4. The jet engine of claim 2, further comprising at least one exhaust manifold communicating with an exhaust port of said turbine, said exhaust port being arranged opposite said intake port on a chordal flowpath through said turbine.

5. The jet engine of claim 4, wherein said at least one exhaust manifold receives spent combustion gasses from said turbine and discharges the spent combustion gasses adjacent said fan.

6. The jet engine of claim 5, wherein at least a portion of said at least one exhaust manifold extends through the working fluid, thereby enabling heat transfer between the spent combustion gasses and the working fluid.

7. The jet engine of claim 4, wherein said exhaust manifold comprises a catalytic converter.

8. The jet engine of claim 4, wherein said exhaust manifold comprises a noise-reducing muffler.

9. The jet engine of claim 4, wherein said intake port and said exhaust port define a first power section of said turbine, and wherein said turbine further comprises a second intake port and a second exhaust port defining a second power section generally diametrically opposite said first power section.

10. A turbine system for extracting energy from the combustion gasses exiting the combustion chamber of a jet engine and converting the energy to drive the compressor of the jet engine, said turbine system comprising:
    (a) a housing;
    (b) a turbine rotor mounted within said housing and rotational about an axis of rotation;
    (c) a plurality of blades extending generally radially from said turbine rotor; and
    (d) at least one intake manifold for receiving at least a portion of the combustion gasses exiting the combustion chamber and directing the fluid along a flow path into said housing generally perpendicular to the axis of rotation of said turbine rotor, wherein the turbine system is coupled to a fan of the jet engine.

11. The turbine system of claim 10, wherein said turbine housing comprises a first intake port and a first exhaust port defining a first power section therebetween, the combustion gasses flowing along a chordal flowpath across said turbine rotor between said first intake port and said first exhaust port.

12. The turbine system of claim 11, further comprising a second intake port and a second exhaust port defining a second power section therebetween, said second power section generally diametrically opposite said first power section.

13. The turbine section of claim 12, wherein each intake port communicates with one said intake manifold, and wherein each exhaust port communicates with an exhaust manifold.

14. The turbine section of claim 13 wherein said exhaust manifolds comprise emissions control devices.

15. The turbine section of claim 14, wherein said emissions control devices comprise catalytic converters.

16. The turbine section of claim 14, wherein said emissions control devices comprise noise-reducing mufflers.

17. The turbine section of claim 10, wherein said housing comprises at least one cutout section for exposing said plurality of blades to a flow of cooling air.

18. A turbine and manifold system for a jet engine, said turbine and manifold system comprising:
 (a) a turbine rotor rotational about an axis of rotation;
 (b) a housing surrounding said turbine rotor;
 (c) an intake manifold for collecting combustion gasses from a combustion chamber of a jet engine and directing the combustion gasses into the housing along a flowpath transverse to and spaced from the axis of rotation of said rotor; and
 (d) an exhaust manifold for collecting spent combustion gasses from the housing and discharging the spent combustion gasses adjacent an intake of the jet engine.

19. The turbine and manifold system of claim 18, wherein said exhaust manifold comprises means for controlling pollutants emitted from the jet engine.

20. The turbine and manifold system of claim 18, wherein the engine generates thrust in a working fluid and wherein at least a portion of said exhaust manifold extends in thermal contact with the working fluid.

21. A turbine for a jet engine, said turbine comprising:
 (a) a turbine rotor rotational about an axis of rotation;
 (b) a housing surrounding said turbine rotor and comprising at least one cutout section for exposing a portion of said turbine rotor to a flow of cooling air; and
 (c) at least one intake manifold for receiving combustion gasses and directing the combustion gasses along a flowpath transverse to and spaced from the axis of rotation of said rotor.

* * * * *